United States Patent
Lindoff et al.

(10) Patent No.: US 9,426,681 B2
(45) Date of Patent: Aug. 23, 2016

(54) METHOD AND RADIO RECEIVER ENABLING HARMONIC DISTORTION ESTIMATION

(75) Inventors: Bengt Lindoff, Bjärred (SE); Fredrik Tillman, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 14/125,723

(22) PCT Filed: Jun. 13, 2012

(86) PCT No.: PCT/EP2012/061146
§ 371 (c)(1),
(2), (4) Date: Jan. 7, 2014

(87) PCT Pub. No.: WO2012/171930
PCT Pub. Date: Dec. 20, 2012

(65) Prior Publication Data
US 2015/0038097 A1 Feb. 5, 2015

Related U.S. Application Data

(60) Provisional application No. 61/501,944, filed on Jun. 28, 2011.

(30) Foreign Application Priority Data

Jun. 15, 2011 (EP) .................................. 11170049

(51) Int. Cl.
*H04B 1/10* (2006.01)
*H04W 24/08* (2009.01)
(Continued)

(52) U.S. Cl.
CPC .............. *H04W 24/08* (2013.01); *H04B 1/109* (2013.01); *H04B 17/008* (2013.01);
(Continued)

(58) Field of Classification Search
CPC ........ H04B 1/10; H04B 1/1027; H04B 1/109; H04B 17/0045; H04B 17/005; H04B 17/0052; H04B 17/0055; H04B 17/0057; H04B 17/0085; H04B 17/309; H04B 17/318; H04B 17/345; H04B 17/354
USPC .......... 455/226.1, 226.2, 226.3, 296, 306, 307
See application file for complete search history.

(56) References Cited

U.S. PATENT DOCUMENTS 6,047,171 A * 4/2000 Khayrallah et al. .......... 455/266
7,295,812 B2 11/2007 Haapoja et al.
(Continued)

FOREIGN PATENT DOCUMENTS

EP 1198067 A2 4/2002
EP 1863309 A1 12/2007
(Continued)

*Primary Examiner* — Duc M Nguyen
(74) *Attorney, Agent, or Firm* — Murphy, Bilak & Homiller, PLLC

(57) ABSTRACT

A method of estimation of harmonic distortion level for a radio receiver operative in a cellular communication system enabled to receive signals from transmitters of one or more cells is disclosed. The method comprises measuring, within a bandwidth of operation, a total received signal power; measuring, within the bandwidth of operation, a received signal power of signals received from the one or more cells, respectively; and estimating a level of harmonic receiver distortions by: determining whether a fraction of the total received signal power and a theoretical noise floor is below or above a first threshold; or determining whether a remaining part of the total received signal power, said remaining part not including said fraction, is above or below a second threshold. A such radio receiver, and a computer program for implementing the method are also disclosed.

27 Claims, 2 Drawing Sheets

(51) Int. Cl.
  *H04W 52/02*  (2009.01)
  *H04B 17/00*  (2015.01)
  *H04B 17/345*  (2015.01)

(52) U.S. Cl.
  CPC ..... *H04W 52/0229* (2013.01); *H04W 52/0238*
    (2013.01); *H04B 1/1036* (2013.01); *H04B*
    *17/345* (2015.01); *Y02B 60/50* (2013.01)

(56) References Cited

U.S. PATENT DOCUMENTS

| | | | | |
|---|---|---|---|---|
| 8,040,866 | B2* | 10/2011 | Hokao | H04B 1/7097 370/342 |
| 8,855,592 | B2* | 10/2014 | Belogolovy et al. | 455/296 |
| 2003/0153370 | A1 | 8/2003 | Sako | |
| 2004/0062216 | A1* | 4/2004 | Nicholls et al. | 370/320 |
| 2006/0171449 | A1 | 8/2006 | Lindoff et al. | |
| 2007/0066228 | A1* | 3/2007 | Leinonen et al. | 455/67.11 |
| 2007/0111663 | A1* | 5/2007 | Beyer et al. | 455/63.1 |
| 2007/0155329 | A1* | 7/2007 | Mehrabanzad et al. | 455/63.1 |
| 2007/0155395 | A1 | 7/2007 | Gopalakrishnan et al. | |
| 2007/0262817 | A1 | 11/2007 | Ciccarelli et al. | |
| 2007/0270100 | A1* | 11/2007 | Agrawal et al. | 455/67.11 |
| 2008/0014979 | A1* | 1/2008 | Gorokhov et al. | 455/522 |
| 2008/0069275 | A1 | 3/2008 | Horiguchi et al. | |
| 2008/0143580 | A1* | 6/2008 | Glazko et al. | 342/17 |
| 2008/0259893 | A1* | 10/2008 | Murata et al. | 370/342 |
| 2009/0258621 | A1 | 10/2009 | Silvola et al. | |
| 2012/0201152 | A1* | 8/2012 | Yoo et al. | 370/252 |

FOREIGN PATENT DOCUMENTS

| | | |
|---|---|---|
| EP | 1989784 A1 | 11/2008 |
| EP | 2015474 A1 | 1/2009 |
| EP | 2083524 A1 | 7/2009 |
| WO | 2010075643 A1 | 7/2010 |

* cited by examiner

US 9,426,681 B2

METHOD AND RADIO RECEIVER ENABLING HARMONIC DISTORTION ESTIMATION

TECHNICAL FIELD

The present invention generally relates to a method of estimation of harmonic distortion level for a radio receiver operative in a cellular communication system, to such radio receiver, and to a computer program for implementing the method.

BACKGROUND

Performance of radio receivers depend on a multitude of phenomena. Of course, the design of the radio receiver has impact on performance, but also a radio receiver with a well made design may have varying performance due to external phenomena, which may vary over time. One effect of such external phenomena is the causing of harmonic down-conversion distortions. It is therefore a desire to estimate present harmonic distortions.

SUMMARY

An object of the invention is to at least alleviate the above stated problem. The present invention is based on the understanding that by observing present harmonic distortions, the receiver or any apparatus or system in which the receiver is operating will be enabled to deal with the problem. The inventors have found a fairly simple way of estimating the presence and/or level of harmonic distortions. The inventors further provide mechanisms for dealing with the observed problem, when observed by the inventive harmonic distortion estimation.

According to a first aspect, there is provided a method of estimation of harmonic distortion level for a radio receiver operative in a cellular communication system enabled to receive signals from transmitters of one or more cells. The method comprises measuring, within a bandwidth of operation, a total received signal power; measuring, within the bandwidth of operation, a received signal power of signals received from the one or more cells, respectively; and estimating a level of harmonic receiver distortions by either determining whether a fraction of the total received signal power and a theoretical noise floor is below or above a first threshold, or determining whether a remaining part of the total received signal power, said remaining part not including said fraction, is above or below a second threshold.

The estimated level of harmonic receiver distortions may be expressed in absolute values or relative values, e.g. as a fraction of the total received signal power, and may be expressed for example according to a linear or logarithmic scale. Thus, how to base the estimation on the measured total received signal power and the measured received signal power of signals received from the one or more cells includes the question how the estimated level is desired to be expressed.

The method may further comprise estimating a cell load for respective one or more cell, wherein the estimating of the level of harmonic receiver distortions further is based on the estimated cell load for respective one or more cell. Thus, how to arrive at the estimated level may implicate calculations including cell load quantity or quantities.

The radio receiver may be adapted to operate in either of a first linear mode and a second linear mode, wherein the second linear mode is less power consuming than the first linear mode. The method may then further comprise comparing the estimated level of harmonic receiver distortions with a threshold; and operating the radio receiver in the first linear mode only when the estimated level of harmonic receiver distortions is above the threshold.

The radio receiver may be connected to a receiver antenna via a filter. The method may then further comprise comparing the estimated level of harmonic receiver distortions with a threshold; and bypassing the filter only when the estimated level of harmonic receiver distortions is below the threshold.

The measuring of the total received signal power may comprise determining a Received Signal Strength Indicator level. The measuring of received signal power of signals received from the one or more cells may comprise determining power of received pilot signals. The power of received pilot signals may be determined from available Reference Signal Received Power or Reference Signal Received Quality, or from available Received Signal Code Power or $E_c/I_0$.

The measuring of the total received signal power may comprise determining a receiver level from available RxLev, and the measuring of received signal power of signals received from the one or more cells comprises determining a bit error rate from available RxQual.

According to a second aspect, there is provided a radio receiver operative in a cellular communication system enabled to receive signals from transmitters of one or more cells. The radio receiver comprises measuring means arranged to measure a total received signal power within a bandwidth of operation; measuring means arranged to measure a received signal power of signals received from the one or more cells, respectively, within the bandwidth of operation; and a harmonic receiver distortion estimator arranged to, based on the measured total received signal power and the measured received signal power of signals received from the one or more cells, estimate a level of harmonic receiver distortions.

The radio receiver may further comprise a cell load estimator arranged to estimate a cell load for respective one or more cell, wherein the harmonic receiver distortion estimator is further arranged to make its estimate based on the estimated cell load for respective one or more cell.

The radio receiver may further be adapted to operate in either of a first linear mode and a second linear mode, wherein the second linear mode is less power consuming than the first linear mode. The radio receiver may further comprise a comparator arranged to compare the estimated level of harmonic receiver distortions with a threshold; and an operation controller arranged to operate the radio receiver in the first linear mode only when the estimated level of harmonic receiver distortions is above a certain level.

Receiver circuitry of the radio receiver may be connected to a receiver antenna via a filter. The radio receiver may further comprise a comparator arranged to compare the estimated level of harmonic receiver distortions with a threshold; and control circuitry arranged to bypass the filter only when the estimated level of harmonic receiver distortions is below the certain level. The control circuitry may further be arranged to bypass the filter only when the total received signal power is determined to be low enough for, when the filter is bypassed, being linearly handled by receiver circuitry.

The radio receiver may further comprise a cell searcher arranged to find signals from the transmitters of the one or more cells.

According to a third aspect, there is provided a computer program comprising computer executable instructions, which when executed on a processor of a radio receiver causes the radio receiver to perform the method according to the first aspect.

Other objectives, features and advantages of the present invention will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION OF PREFERRED EMBODIMENTS

Figure 1:
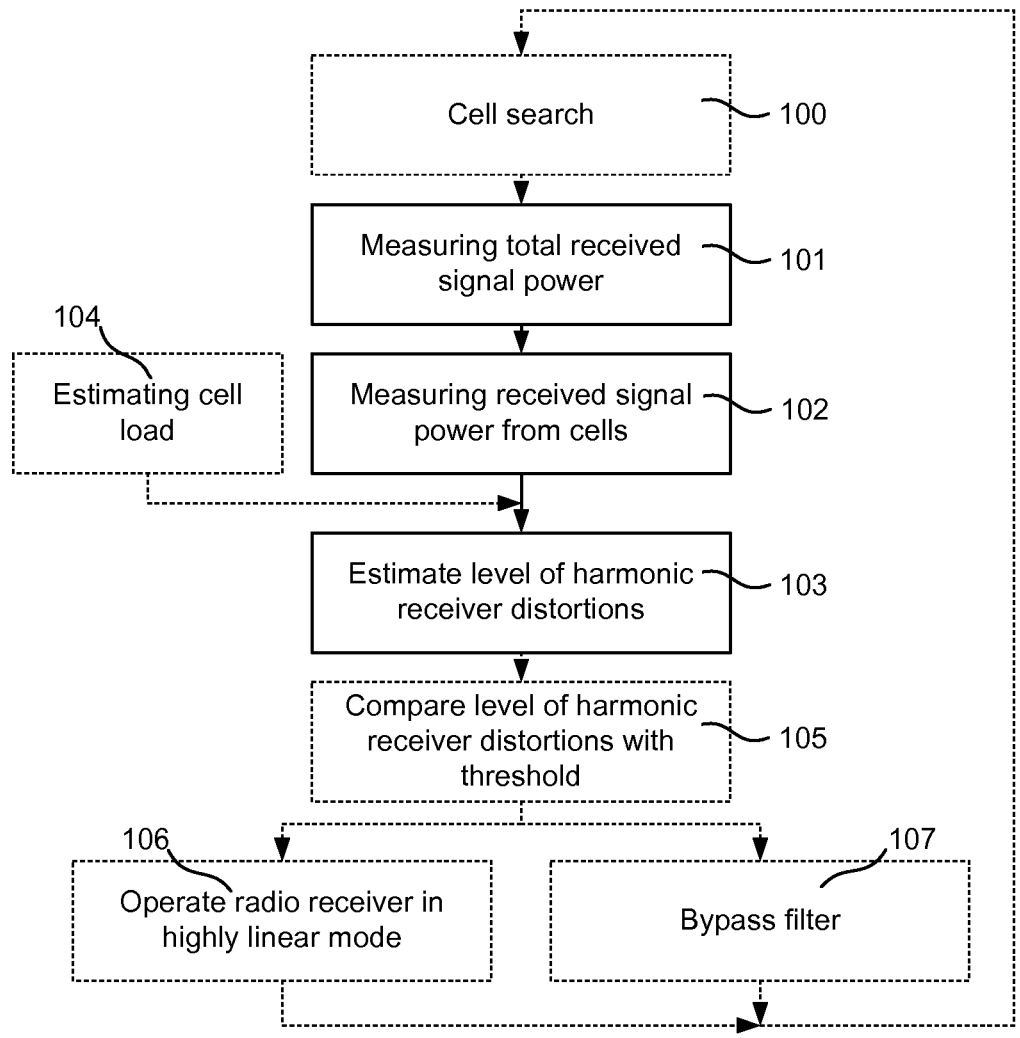
FIG. 1 is a flow chart illustrating methods according to embodiments.

The invention provides approaches for observing harmonic distortions occurring at a radio receiver such that the problem can be dealt with. Furthermore, since power consumption is high on the agenda for mobile terminals, this is also taken into account for some of the embodiments when dealing with the problem of harmonic distortions. One way to reduce the power consumption is to make an adaptive radio with adaptation based on current radio scenarios. Traditionally radio design is made based on worst case scenarios. However the concept of adaptive radio means that the radio should be able to vary its performance according to present needs, and thereby minimize its momentary power consumption for every given scenario. For instance, when the interferer and blocker levels are low, adapt the radio receiver by reducing the linearity requirements and thereby consume less power. Similarly, in a more hostile reception environment with many blockers present, linearity of the receiver may be increased at the expense of higher power consumption. Especially in a design with a high radio hardware integration level, all countermeasures to cope with tough spectral conditions add to additional power consumption compared to more relaxed scenarios. Thus it is desirable for a highly integrated solution to be able to track current radio conditions and adapt its performance accordingly.

Traditionally, any adaptation is only made due to in-band signal levels. In case of a high signal level, it is possible to use a radio with low radio performance, for example in terms of high noise figure and low gain, whereas low signal level requires the opposite. A typical problem is when the wanted input signal level is weak compared to interfering signals, forcing the receiver to a high gain mode while still preserving good enough linearity to handle the blockers. In a regular receiver for standard cellular Time Division Duplex (TDD) systems, the out-of-band blocking is to a large extent taken care of by passive filtering prior an integrated radio solution, i.e. a filter between the antenna and the radio input of an integrated circuit (IC) forming the receiver/transceiver circuitry. This filter does not only relax the compression point of the receiver, thanks to lower blocking levels present at the radio IC input, but also relaxes the harmonic down-conversion requirements of the receiver. Since the down-conversion process inside the radio IC typically involves switch-mixers, the effective mixer function applied to the input signal of the radio contains harmonics which will down-convert unwanted signals to the exact location of the wanted down-converted signal. As a result, the wanted signal will potentially be obscured by unwanted signals falling on top of the desired ones.

In a highly integrated radio solution where no external filter is being used between the antenna and radio IC, the radio IC itself preferably shows enough harmonic rejection to compensate for the filter absence. However, it is only when there are actual interferers present at harmonic distances from the wanted radio frequency (RF) signal that this becomes a problem in reality. As a result, it is paramount for the radio IC to know when a high level of harmonic distortion is present, and thus a high level of harmonic rejection is needed, and thus can adapt to higher requirements, in order to minimize power consumption.

Regular adaptation based only on the received signal power level will fail due to the fact that harmonic down-conversion deteriorates the wanted signal without reducing its power level. Therefore, the advantages of a method and apparatus capable to detect the presence or absence of harmonic down-conversion, as will be elucidated below, are notable, least to say, and the advantages of adapting the radio performance when needed can hardly be overestimated.

The invention is based on the fact that the total signal level in the received system bandwidth, as long as there is no internal generated harmonic distortion in the receiver, can be described by the sum over signal power for all detected cells and the thermal noise power. In case the total signal power is significantly larger than this level, there is an indication that there is some kind of inter-frequency interference is present in-band, typically originated by nonlinear mixing in the front end receiver, i.e. Low Noise Amplifier (LNA), Mixer, etc. The total signal level can typically be determined from a measurement of Received Signal Strength Indicator (RSSI), while the signal power for respective cell can be estimated based on received pilot signal power and system specific relationship, i.e. depending on the used Radio Access Technology (RAT), between the pilot power and the total signal power. In some embodiments such relationship can be explicitly estimated, while in another embodiments the relationship can be based on some tabulated values.

FIG. 1 is a flow chart illustrating methods according to embodiments. The solid line boxes illustrate a basic embodiment, while the hashed line boxes illustrate options and different embodiments, as will be elucidated below.

The illustrated method according the basic embodiment aims for estimation of harmonic distortion level, and should be construed for the context of a radio receiver operative in a cellular communication system, where the radio receiver receives signals from transmitters of one or more cells, e.g. from base stations operating the cells. The one or more cells are normally defined by a cell search operation 100 where the cells in question are the cells detected and registered in a neighbour cell list. Thus, received signals, which may have been processed in one or more analog and/or digital processing steps, as described above, are considered present. The method includes measuring 101 a total received signal power. This is made within a bandwidth of operation, which, if the signals are not bandwidth limited by previous processing steps, is taken care of by digital or analog means in the measuring step. The method also includes measuring 102, also here within the bandwidth of operation, a received signal power of signals received from the cells, respectively. From these measurements, estimation 103 is performed and thus based on the measured total received signal power and the measured received signal power of signals received from the one or more cells, a level of harmonic receiver distortions can be provided. Depending on the form of the measured amounts, the estimation 103 can be a more or less complex calculation, but in the embodiments disclosed below, it can be seen that the calculations can be kept at a low complexity level, which should neither be power or time consuming.

An exemplary context of the invention will now be described. The receiver is configured to be in wireless connection to a remote node, which is normally called base station, Node B, or eNode B depending on the current standard. On regular basis, a terminal in which the receiver forms the operating element for receiving signals from the remote node does cell search in order to find neighbour cells as potential handover candidates. Cell search algorithms are dependent on the current Radio Access Technology (RAT) used. The receiver can then on regular basis, for example every 20 to 80 ms, determine a total received signal strength within the system bandwidth, such as received signal strength indicator (RSSI) for which mechanisms in the terminal normally are provided. The receiver then also determines signal power known to emanate from respective cell ($RSSI_{known\_cell}$), for example by doing pilot power measurements on all detected cells. For instance, in case of Wideband Code Division Multiple Access (WCDMA) the Received Signal Code Power (RSCP) is determined, while in Long Term Evolution (LTE) the Reference Signal Received Power (RSRP) is determined. Then the terminal determines e.g. the fraction of RSSI that can be described by the detected cells, and the theoretical thermal noise floor (n) including the estimated noise figure for the receiver. This fraction is the amount of RSSI caused by known cells and thermal noise, which may also be referred to as an $RSSI_{fraction}$. Harmonic receiver distortions may be found in the remaining part of the RSSI, also referred to as $RSSI_{unknown}$, i.e. the part of the RSSI not including the $RSSI_{fraction}$.

Accordingly, the total received signal strength (RSSI) may be described in accordance with the following formula:

$$RSSI = RSSI_{known\_cell} + n + RSSI_{unknown} = RSSI_{fraction} + RSSI_{unknown}.$$

In general, if the $RSSI_{fraction}$ is high, there is low harmonic receiver distortions as $RSSI_{unknown}$ is relatively small in comparison to the $RSSI_{fraction}$ action and/or the RSSI.

On the other hand, if the $RSSI_{fraction}$ is low, a higher amount of harmonic receiver distortions may be present, as $RSSI_{unknown}$ is relatively larger in comparison to the $RSSI_{fraction}$ action and/or the RSSI.

Accordingly, if the $RSSI_{fraction}$ is above a certain threshold, e.g. defined as a $RSSI_{fraction}$ action threshold, then the received signal power can be described by the in-band received signals and hence the noise impact due harmonic distortion is small as the $RSSI_{unknown}$ is small in comparison to the RSSI. In this event the receiver can operate in a low power, i.e. less linear, reception mode. On the other hand, in case the $RSSI_{fraction}$ is less than the threshold, there is a large part of the in-band signal power that cannot be determined by the detected in-band signals as the $RSSI_{unknown}$ is relatively larger in comparison to the RSSI. In this event there is an increased risk of higher harmonic receiver distortion. Given the power of the $RSSI_{unknown}$ may also be caused by unknown cells or other external interferers, it is uncertain that a higher amount of harmonic receiver distortions is actually present when the $RSSI_{fraction}$ is lower than the $RSSI_{fraction}$ action threshold. Nevertheless, in this case the analog radio is adapted to a more linear mode, which also implies more power consumption to cope for the increased risk or level of harmonic receiver distortion.

According to an embodiment, the actual value of the $RSSI_{unknown}$ may constitute the estimated level of harmonic receiver distortion.

Instead of comparing the $RSSI_{fraction}$ to a $RSSI_{fraction}$ threshold, it is equally possible to comparing the $RSSI_{unknown}$ to a further threshold, e.g. defined as a $RSSI_{unknown}$ threshold.

As follows from the discussion above, in general if the $RSSI_{unknown}$ is low in relation to the RSSI, there is low harmonic receiver distortion, and if the $RSSI_{unknown}$ is higher in relation to the RSSI, a higher amount of harmonic receiver distortions may be present.

In some embodiments the radio receiver is adapted to operate in either of a first linear mode and a second linear mode, wherein the second linear mode is less power consuming than the first linear mode. The first linear mode is preferred when the risk of harmonic receiver distortions is high or at least being of significance. This occurs when the estimated harmonic receiver distortions is above a certain level.

In some embodiments the certain level may correspond to the level of the $RSSI_{unknown}$ threshold. Accordingly, if $RSSI_{unknown}$ is larger than the $RSSI_{unknown}$ threshold, then the radio receiver is operated in a first linear mode. If the $RSSI_{unknown}$ is less than the $RSSI_{unknown}$ threshold the radio receiver is operated in a second linear mode.

In some embodiments, the estimated harmonic receiver distortions is above the certain level when the fraction of the total received signal power and a theoretical noise floor is below the $RSSI_{fraction}$ threshold.

The threshold chosen, e.g. $RSSI_{fraction}$ threshold or the $RSSI_{unknown}$ threshold is selected based upon which of the entities $RSSI_{fraction}$ or $RSSI_{unknown}$ that are used in the estimation of the level of harmonic receiver distortion.

A common feature of the $RSSI_{fraction}$ threshold and the $RSSI_{unknown}$ threshold is that the difference between an ideal case where only power caused by known cells and thermal noise is present and an actual case where other unidentified interference, which is assumed to essentially be harmonic receiver distortion, counted in dB, is compared to said threshold.

In case of the $RSSI_{fraction}$, the threshold may be formed as a relation between a fraction of the total received signal strength within the system bandwidth and a thermal noise floor, and the signal power known to emanate from respective cell.

In an embodiment, the threshold is set to a range of 5 to 10 dB. When considering the $RSSI_{fraction}$ this means that if the RSSI exceeds the signal power known to emanate from the known cells including the thermal noise floor, e.g. represented by the $RSSI_{fraction}$, with at most 5 to 10 dB, the noise impact due to harmonic receiver distortions is considered being small or insignificant. This in turn is an indication that the radio received may be operated in a low power mode, e.g. the second linear mode mentioned above.

Moreover, if the RSSI exceeds the signal power known to emanate from the known cells, e.g. represented by the $RSSI_{fraction}$, with more than 5-10 dB, the noise impact due to harmonic receiver distortions may not be discarded as being small or insignificant. This in turn is an indication that the radio received may be operated in a higher power mode, such as the first linear mode mentioned above.

When considering the $RSSI_{unknown}$, if the $RSSI_{unknown}$ make up more than 5 to 10 dB of the RSSI, e.g. when comparing the RSSI in relation to the $RSSI_{fraction}$, then the noise impact or level of harmonic receiver distortions may not be discarded as being small or insignificant.

On the other hand, if the $RSSI_{unknown}$ make up less than 5 to 10 dB of the RSSI, e.g. when comparing the RSSI in relation to the $RSSI_{fraction}$, then the noise impact or level of harmonic receiver distortions may be considered as being small or insignificant.

The threshold chosen does not necessarily have to be limited to a certain range, e.g. 5 to 10 dB as explained above, but may be set at a fix power relation, such as 5 dB, or 10 dB. In some embodiments, the threshold may be set to 6 dB, 7 dB, 8 dB, or 9 dB.

According to an embodiment for the LTE case, the algorithm can be as described below. In LTE, the cell search algorithm is capable to detect cells around −8 to −10 dB below the strongest cell. Hence the signal power contribution from non detected cells can be assumed to be negligible. RSRP is measured as signal power per pilot Resource Element (RE), and hence total signal power from the cell can be estimated as $N_{RE}*RSRP$, where $N_{RE}$ is the total number of RE:s, e.g. 1200 in 20 MHz case. This will be an upper bound for the total signal power from the cell, considering a fully loaded cell. Hence the trigger for harmonic distortion in this case will be $$\sum_i 10\log_{10}(N_{RE} \cdot RSRP_i) + n \ll RSSI$$

where n is the thermal noise floor based on Bolzmann's constant, temperature, and bandwidth, together with a determined, known or estimated noise factor for the receiver, and $i=1 \ldots N_{cell}$, i.e. number of detected cells. Here, the "much smaller" typically means 5 to 10 dB less.

In LTE, the power of received pilot signals can also be determined from available Reference Signal Received Quality (RSRQ), which is defined as the ratio NxRSRP per carrier RSSI, where N is the number of resource blocks of the carrier RSSI measurement bandwidth. Here, any measurements in the numerator and denominator are made over the same set of resource blocks.

According to another embodiment for the WCDMA case, considering operation in High Speed mode, the algorithm can be as described below. In WCDMA, the cell search algorithm is capable to detect cells around −10 to −12 dB below the strongest cell. Hence the signal power contribution from non detected cells can be assumed to be negligible. RSCP is measured as signal power for a pilot channel, e.g. the Common Pilot Channel (CPICH). The CPICH is, in a fully loaded cell, 5-10% of total base station power and hence total signal power from the cell can be estimated as a value between 10 and 20 times the RSCP. This will be an upper bound for the total signal power from the cell, i.e. when fully loaded. Hence the trigger for harmonic distortion in this case will be $$\sum_i 10\log_{10}(10 RSCP_i) + n \ll RSSI$$

where n is the thermal noise floor based on Bolzmann's constant, temperature, and bandwidth, together with a determined, known or estimated noise factor for the receiver, and $i=1 \ldots N_{cell}$, i.e. number of detected cells. Here, the "much smaller" typically means 5 to 10 dB less.

In WCDMA, the power of received pilot signals can also be determined from available $E_c/I_0$, which is a ratio of received pilot energy and total received energy or total spectral density.

According to another embodiment for the Global System for Mobile communications (GSM) case the algorithm can be as described below. Since GSM utilize a frequency reuse greater than one, there should, in theory, not be any detected intra frequency neighbour cells. RXLEV is a figure used in GSM where a received signal level is assigned the figure, e.g. 0 for less than −110 dBm, 1 for −110 dBm to −109 dBm, etc. RXQUAL is another figure used in GSM and a part of network measurement reports. These figures are thus normally available. In GSM, the RXQUAL indicates a bit error rate. This can be mapped to an signal-to-noise ratio (SNR) level. Assuming that the GSM is operating in an environment with SNR>3 to 5 dB, where the 3 to 5 dB represents interference from neighbouring cells, the trigger for harmonic distortion could be the mapped SNR from the RXQUAL plus needed operating level, say 3 dB, being significantly lower than a corresponding value based on the RXLEV.

In some of the examples described above, an assumption has been made that cells are fully loaded. This is of course not always the case. For further improving the estimation of level of harmonic distortion levels, any knowledge of cell load can be included in the estimation. Therefore, a cell load is first estimated, or achieved from other mechanisms in the terminal using that figure, and then the estimation of the level of distortions is performed based on the measured total received signal power and the measured received signal power of signals received from the one or more cells, and on the estimated or achieved cell load. In some embodiment, the cell load can be estimated, based for instance on (G-)Rake combining weights.

In the LTE case, the load can be determined by comparing RSSI for different OFDM symbols. For example, in a first OFDM symbol in every frame including only control signalling, the resource elements are full or almost full regardless of the load, while a last OFDM symbol in first and second slot in a subframe only comprises data symbols, i.e. there are not pilots and such, and its RSSI is essentially linear to the load in that cell, and by considering the RSSI of the first OFDM symbol, the load can be fairly estimated. By estimating the RSSI per OFDM symbol and knowing the timing for different detected cells, and hence the different load possibilities for different OFDM symbols, the RSRP for the different cells can give an indication of the total load in the different cells.

Further approaches for estimating load of a cell in the WCDMA case are demonstrated in U.S. Pat. No. 7,680,082.

According to some embodiments, adaptive filtering is used in the receiver, e.g. a translational impedance filter. It is possible to shunt harmonic content of the input signal before it reaches the down-conversion mixer. This technique implies a higher power consumption since it requires a mixer to translate a filter to wanted frequency, but can easily be turned off when not needed. Here, the same mechanism as disclosed above for putting the receiver in a more or less linear mode is used for activating the filter or bypassing it. Of course this kind of filtering can be combined with other filtering in the stages before the down-conversion stage in order to achieve sufficient harmonic rejection.

In some embodiments, use of harmonic-reject mixers in the down-conversion process is applied. In order to save power consumption, the mixers can be reconfigurable so they only enter the high-rejection mode then harmonics are being present. Also here, the same mechanism as disclosed above for putting the receiver in a more or less linear mode is used for activating/deactivating the high-rejection mode.

In some embodiments, when external filters between an antenna and radio circuitry, preferably when considering integrated circuit radio circuitry, are used, such as Surface Acoustic Wave (SAW) filters, they can be by-passed when not needed, e.g. when no harmonic content of the input signal is present. Of course this implies that the receiver is linear enough to handle all received signal energy. However, by doing this the sensitivity level of the receiver would increase since no filter insertion loss is present in the signal pass. Also here, the same mechanism as disclosed above for putting the receiver in a more or less linear mode is used for activating or bypassing the external filter. Hence, the external filter may be activated when the estimated level of harmonic receiver distortions is above a certain level, e.g. when the $RSSI_{unknown}$ is above the $RSSI_{unknown}$ threshold.

In some of the embodiments demonstrated above, there can also be added a constraint limiting the triggering of using the high power consumption modes to make the receiver even more lean in power consumption. An example of this is that the transition to the high power consumption mode is just enabled when a certain amount of block error rate is present, or any other indication on bad detection performance. The reason for the bad detection performance may not be harmonic distortion; it can be due to a neighbouring cell being too strong. However, the approach of the embodiments demonstrated above will still keep fairly lean if the reason for the bad detection performance was due to other reasons than harmonic distortions.

Figure 2:
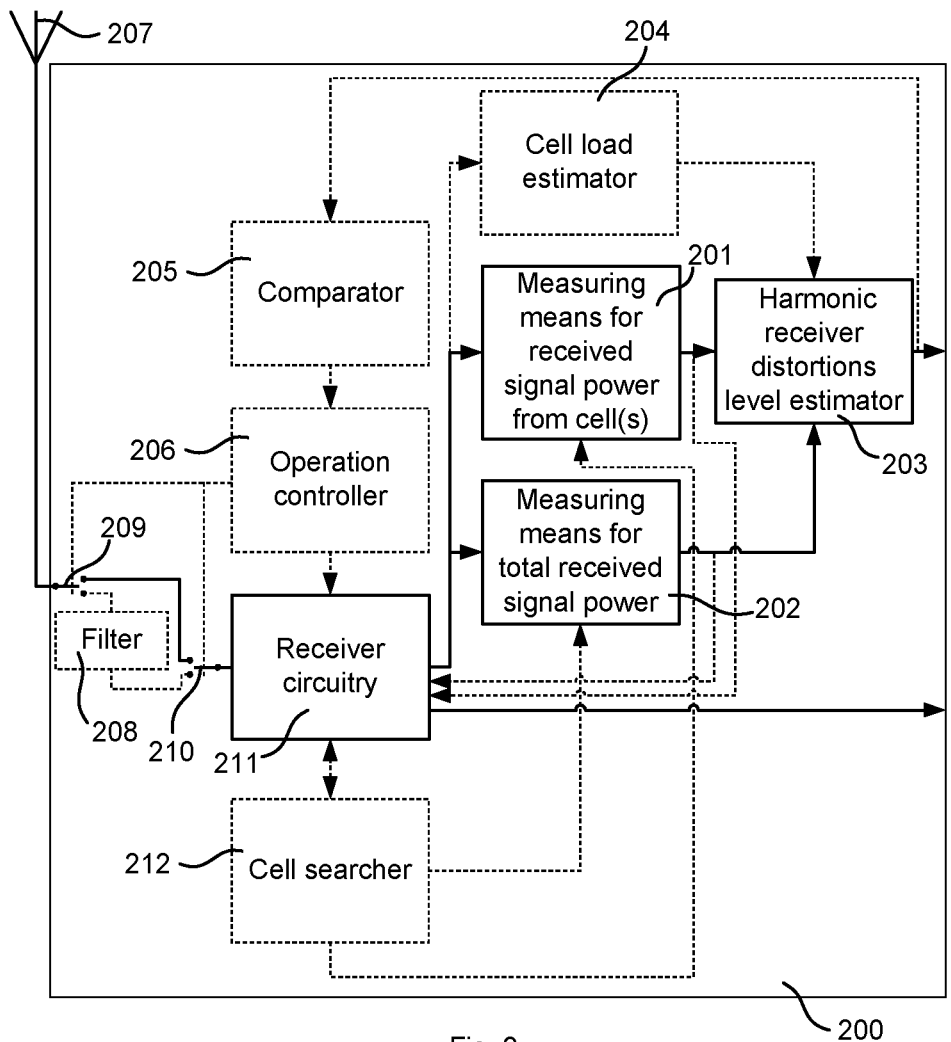
FIG. 2 is a block diagram schematically illustrating a radio receiver according to embodiments.

FIG. 2 is a block diagram schematically illustrating a radio receiver 200 according to embodiments. The solid line boxes illustrate a basic embodiment, while the hashed line boxes illustrate options and different embodiments, as will be elucidated below.

The radio receiver 200 is presumed to be operative in a cellular communication system (not shown) and be enabled to receive signals from transmitters of one or more cells, e.g. base stations operating the cells, or repeater stations. The radio receiver 200 comprises measuring means 201 arranged to measure a total received signal power. Here, as elucidated above with reference to FIG. 1, the measuring of signals is performed within a bandwidth of operation. The radio receiver also comprises measuring means 202 arranged to measure a received signal power of signals received from the one or more cells, respectively, within the bandwidth of operation. Here, the terms "measuring means" should be construed broadly, since they can be circuitry measuring directly from received signal, digital/analog signal processing device(s) extracting measurements from received/detected/digitised/decoded/etc. signals provided by receiver circuitry 211, or software objects collecting data from which the measurements are derivable from other elements of the radio receiver 200, or a combination of these elements. The measuring means 201, 202, whatever their physical appearance, do however provide a measurement of the total received signal power and a measurement of received signal power from the cells, respectively. A harmonic receiver distortion estimator 203 is arranged to, based on the measured total received signal power and the measured received signal power of signals received from the one or more cells, estimate a level of harmonic receiver distortions.

Figure 3:
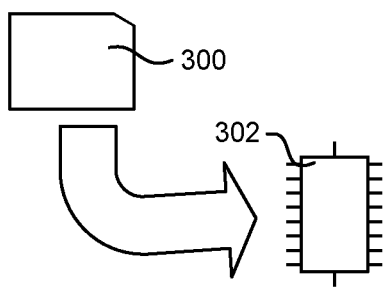
FIG. 3 schematically illustrates a computer readable medium and a processing device of a radio receiver which is caused to perform methods according to embodiments when a computer program stored on the computer readable medium is executed by the processing device.

The methods according to the present invention is suitable for implementation with aid of processing means, such as computers and/or processors, especially for the case where the radio receiver comprises a processor for controlling its operation, and for performing the tasks of collecting information, calculating, estimating, etc. Therefore, there is provided computer programs, comprising instructions arranged to cause the processing means, processor, or computer of the radio receiver to perform the steps of any of the methods according to any of the embodiments described with reference to FIG. 1. The computer programs preferably comprises program code which is stored on a computer readable medium 300, as illustrated in FIG. 3, which can be loaded and executed by a processing means, processor, or computer 302 to cause it to perform the methods, respectively, according to embodiments of the present invention, preferably as any of the embodiments described with reference to FIG. 1. The computer 302 and computer program product 300 can be arranged to execute the program code sequentially where actions of the any of the methods are performed stepwise. However, the execution is preferably what is called real-time based, where operations are performed when necessary data for the operation are present. The processing means, processor, or computer 302 is preferably what normally is referred to as an embedded system. Thus, the depicted computer readable medium 300 and computer 302 in FIG. 3 should be construed to be for illustrative purposes only to provide understanding of the principle, and not to be construed as any direct illustration of the elements.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of estimation of harmonic distortion level for a radio receiver operative in a cellular communication system and enabled to receive signals from transmitters of one or more cells, the method comprising:
   measuring, within a bandwidth of operation, a total received signal power;
   measuring, within the bandwidth of operation, a received signal power of signals received from detected cells of the one or more cells, respectively; and
   estimating a level of harmonic receiver distortions by determining what fraction of the total received signal power is accounted for by the received signal power from the detected cells and a theoretical noise floor,
   wherein the radio receiver is adapted to operate in either of a first linear mode and a second linear mode, wherein the second linear mode has a lower power consumption than the first linear mode but provides a lower level of harmonic rejection than the first linear mode, and wherein the method further comprises operating the radio receiver in the first linear mode when the estimated level of harmonic receiver distortions is above a certain level.

2. The method of claim 1, wherein estimating the level of harmonic receiver distortions comprises determining whether the fraction is below or above a first threshold, or determining whether a remaining part of the total received signal power is above or below a second threshold, where said remaining part is the total received signal power minus said fraction.

3. The method according to claim 2, wherein the first or second threshold is set to a range of 5 to 10 dB.

4. The method according to claim 2, wherein the first or second threshold is set to 5 dB, 6 dB, 7 dB, 8 dB, 9 dB, or 10 dB.

5. The method according to claim 1, further comprising estimating a cell load for one or more respective ones of the one or more cells, and wherein the estimating of the level of harmonic receiver distortions further is based on the estimated cell load for the respective one or more cells.

6. The method according to claim 1, wherein the radio receiver further comprises an adaptive filter that is activated for operation in the first linear mode.

7. The method according to claim 1, wherein the radio receiver is connected to a receiver antenna via an adaptive filter, and wherein the method further comprises:
bypassing the filter for operation in the second linear mode, only when the estimated level of harmonic receiver distortions is below the certain level.

8. The method according to claim 7, wherein the estimated level of harmonic receiver distortions is above the certain level when said fraction is below a first threshold, or when a remaining part of the total received signal power is above a second threshold, said remaining part being the total received signal power minus said fraction.

9. The method according to claim 1, wherein the measuring of the total received signal power comprises determining a Received Signal Strength Indicator level.

10. The method according to claim 1, wherein the measuring of the received signal power of signals received from the one or more cells comprises determining the power of received pilot signals.

11. The method according to claim 10, wherein the power of the received pilot signals is determined from available Reference Signal Received Power or Reference Signal Received Quality.

12. The method according to claim 10, wherein the power of the received pilot signals is determined from available Received Signal Code Power or $E_c/I_0$.

13. The method according to claim 1, wherein the measuring of the total received signal power comprises determining a receiver level from available RxLev, and wherein the measuring of the received signal power of signals received from the one or more cells comprises determining a bit error rate from available RxQual.

14. A method of estimation of harmonic distortion level for a radio receiver operative in a cellular communication system and enabled to receive signals from transmitters of one or more cells, the method comprising:
measuring, within a bandwidth of operation, a total received signal power;
measuring, within the bandwidth of operation, a received signal power of signals received from detected cells of the one or more cells, respectively; and
estimating a level of harmonic receiver distortions by determining what fraction of the total received signal power is accounted for by the received signal power from the detected cells and a theoretical noise floor,
wherein the radio receiver is adapted to operate in either of a first linear mode and a second linear mode, wherein the second linear mode has a lower power consumption than the first linear mode but provides a lower level of harmonic rejection than the first linear mode, and
wherein the method further comprises operating the radio receiver in the first linear mode when the estimated level of harmonic receiver distortions is above a certain level, and a certain amount of block error or other indication of bad detection performance is present.

15. A radio receiver operative in a cellular communication system enabled to receive signals from transmitters of one or more cells, the radio receiver comprising:
circuitry configured to measure a total received signal power within a bandwidth of operation, and to measure a received signal power of signals received from detected cells of the one or more cells, respectively, within the bandwidth of operation; and
a harmonic receiver distortion estimator configured to estimate a level of harmonic receiver distortions, by determining what fraction of the total received signal power is accounted for by the received signal power from the detected cells and a theoretical noise floor,
wherein the radio receiver is configured to operate in either of a first linear mode and a second linear mode, wherein the second linear mode consumes less power than the first linear mode but has a lower level of harmonic rejection, and wherein the radio receiver further comprises an operation controller configured to operate the radio receiver in the first linear mode when the estimated level of harmonic receiver distortions is above a certain level.

16. The radio receiver according to claim 15, further comprising a cell load estimator arranged to estimate a cell load for a respective one or more of the one or more cells, and wherein the harmonic receiver distortion estimator is further arranged to estimate the level of harmonic receiver distortions based on the estimated cell load for the respective one or more cells.

17. The radio receiver according to claim 15, wherein the radio receiver further comprises an adaptive filter, and wherein the radio receiver is configured to activate the adaptive filter for operation in the first linear mode.

18. The radio receiver according to claim 15, wherein the radio receiver is connected to a receiver antenna via an adaptive filter, and wherein the radio receiver further comprises control circuitry arranged to bypass the filter for operation in the second linear mode, only when the estimated level of harmonic receiver distortions is below the certain level.

19. The radio receiver according to claim 18, wherein the control circuitry is further configured to bypass the filter only when the total received signal power is determined to be low enough for being linearly handled by receiver circuitry without benefit of the filter.

20. The radio receiver according to claim 18, wherein the estimated level of harmonic receiver distortions is deemed to be above the certain level when said fraction is below a first threshold.

21. The radio receiver according to claim 18, wherein the estimated level of harmonic receiver distortions is deemed to be above the certain level when a remaining part of the total received signal power is above a second threshold, said remaining part being the total received signal power minus said fraction.

22. The radio receiver according to claim 15, further comprising a cell searcher arranged to find signals from the transmitters of the one or more cells.

23. The radio receiver according to claim 15, wherein the harmonic receiver distortion estimator is configured to estimate the level of harmonic receiver distortions by determining whether said fraction is below or above a first threshold, or by determining whether a remaining part of the total received signal power is above or below a second threshold, where said remaining part is the total received signal power minus said fraction.

24. The radio receiver according to claim 23, wherein the first or second threshold is set to a range of 5 to 10 dB.

25. The radio receiver according to claim 23, wherein the first or second threshold is set to 5 dB, 6 dB, 7 dB, 8 dB, 9 dB, or 10 dB.

26. A radio receiver operative in a cellular communication system enabled to receive signals from transmitters of one or more cells, the radio receiver comprising:
- circuitry configured to measure a total received signal power within a bandwidth of operation, and to measure a received signal power of signals received from detected cells of the one or more cells, respectively, within the bandwidth of operation; and
- a harmonic receiver distortion estimator configured to estimate a level of harmonic receiver distortions, by determining what fraction of the total received signal power is accounted for by the received signal power from the detected cells and a theoretical noise floor,
- wherein the radio receiver is configured to operate in either of a first linear mode and a second linear mode, wherein the second linear mode consumes less power than the first linear mode but has a lower level of harmonic rejection, and wherein the radio receiver further comprises an operation controller configured to operate the radio receiver in the first linear mode when the estimated level of harmonic receiver distortions is above a certain level, and a certain amount of block error or other indication of bad detection performance is present.

27. A non-transitory computer-readable medium storing a computer program comprising computer executable instructions that, when executed on a processor of a radio receiver configures the radio receiver to:
- measure a total received signal power within a bandwidth of operation;
- measure a received signal power of signals received from detected cells of the one or more cells, respectively, within the bandwidth of operation;
- estimate a level of harmonic receiver distortions by determining what fraction of the total received signal power is accounted for by the received signal power from the detected cells and a theoretical noise floor; and
- operate the radio receiver in either of a first linear mode and a second linear mode, wherein the second linear mode has a lower power consumption than the first linear mode but provides a lower level of harmonic rejection than the first linear mode, and wherein the first linear mode is selected when the estimated level of harmonic receiver distortions is above a certain level.

* * * * *